United States Patent
Wu et al.

(10) Patent No.: US 8,676,812 B1
(45) Date of Patent: Mar. 18, 2014

(54) DYNAMIC WEIGHTING OF INDICATOR VALUES FOR ITEM SCORING

(75) Inventors: Yihua Wu, Princeton Junction, NJ (US); Kumar Mayur Thakur, West Orange, NJ (US)

(73) Assignee: Google Inc., Mountain View, CA (US)

( * ) Notice: Subject to any disclaimer, the term of this patent is extended or adjusted under 35 U.S.C. 154(b) by 443 days.

(21) Appl. No.: 13/016,902

(22) Filed: Jan. 28, 2011

(51) Int. Cl.
*G06F 17/30* (2006.01)
(52) U.S. Cl.
USPC .......................................... 707/748; 707/723
(58) Field of Classification Search
None
See application file for complete search history.

(56) References Cited

U.S. PATENT DOCUMENTS

| | | | | |
|---|---|---|---|---|
| 7,236,267 | B2 * | 6/2007 | McElvain | 358/1.9 |
| 2004/0263877 | A1 * | 12/2004 | McElvain | 358/1.9 |
| 2010/0228631 | A1 * | 9/2010 | Zhang et al. | 705/14.66 |
| 2013/0211565 | A1 * | 8/2013 | Kimoto | 700/94 |

\* cited by examiner

*Primary Examiner* — Anteneh Girma
(74) *Attorney, Agent, or Firm* — Fish & Richardson P.C.

(57) ABSTRACT

Methods, systems, and apparatus, including computer programs encoded on computer storage media, for scoring items. One method includes generating a score for each of a plurality of items. The generating includes, for each item: obtaining a respective item-specific value of each of a plurality of indicators, determining a respective weight for the value of each of the plurality of indicators, wherein the respective weight for one or more of the plurality of indicators is derived from the value of the indicator, and generating the score for the item from the item-specific values and weights for the item-specific values. The method further includes providing the score for each item to a ranking engine implemented on one or more computers.

21 Claims, 3 Drawing Sheets

DYNAMIC WEIGHTING OF INDICATOR VALUES FOR ITEM SCORING

BACKGROUND

This specification relates to information used by a search engine to score and rank resources.

Internet search engines identify resources (e.g., web pages, images, text documents, multimedia content) that are relevant to submitted search queries and return search results corresponding to the identified resources in response to the submitted queries.

Some search engines rank the resources according to a score for each resource. These scores can be determined, for example, by combining multiple indicator values each measuring one or more characteristics of the resource. Some search engines weight each indicator value according to a fixed weight when calculating the score for a resource.

SUMMARY

A search engine generates scores for an item, e.g., a resource that can be the subject of a search or an author identity, by combining indicator values each measuring one or more characteristics of the item according to a formula or processes. An author identity is an identity of an author of resources. For example, an author identity can correspond to a particular screen name used by an author of resources.

One or more of the indicator values are each weighted by a weight that is determined from an indicator-specific function and the value itself. This allows the search engine to emphasize different indicator values for different items. The search engine can then rank resources according to the generated scores or according to different scores derived from the generated scores.

In general, one innovative aspect of the subject matter described in this specification can be embodied in methods that include the actions of generating a score for each of a plurality of items, the generating comprising, for each item: obtaining a respective item-specific value of each of a plurality of indicators; determining a respective weight for the value of each of the plurality of indicators, wherein the respective weight for one or more of the plurality of indicators is derived from the value of the indicator; and generating the score for the item from the item-specific values, wherein generating the score comprises combining the item-specific values and weighting each item-specific value by the respective weight for the value; and providing the score for each item to a ranking engine implemented on one or more computers, wherein the ranking engine ranks resources based, at least in part, on the scores for the items. Other embodiments of this aspect include corresponding systems, apparatus, and computer programs recorded on computer storage devices, each configured to perform the operations of the methods.

These and other embodiments can each optionally include one or more of the following features. Each item-specific value of an indicator is derived from one or more characteristics of the item. Determining the respective weight for a value of an indicator comprises determining the respective weight from an indicator-specific function that takes the value of the indicator as input. The indicator specific function takes the value of the indicator as input and outputs the respective weight for the value of the indicator. The function takes a value of an indicator as input and outputs a respective weight adjustment for the value of the indicator; and determining the respective weight for the value of the indicator further comprises adjusting a base weight for the indicator by the respective weight adjustment. Each item is a resource. Each item is an author identity.

Particular embodiments of the subject matter described in this specification can be implemented so as to realize one or more of the following advantages. A search engine can emphasize different indicator values for different items. This reflects the fact that different indicators best represent different items. This can be particularly useful when the set of indicators being used to score each item is large relative to the number of indicator values that are actually good indicators for any given item. Hand tuning the weight functions can be easier than hand tuning other functions when the indicators have a meaning that the humans tuning the weight functions understand. The weight functions used to determine the weights for each indicator value can be learned by the operation of computer systems performing machine learning processes that operate on smaller and sparser data sets than would be required to achieve the same level of granularity in a score generation function that uses fixed weights, i.e., weights that do not change with the indicator values. The resulting item scores for each item can have more variance than item scores generated using conventional techniques. This can reduce the chance that two items that are actually different will have the same score.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
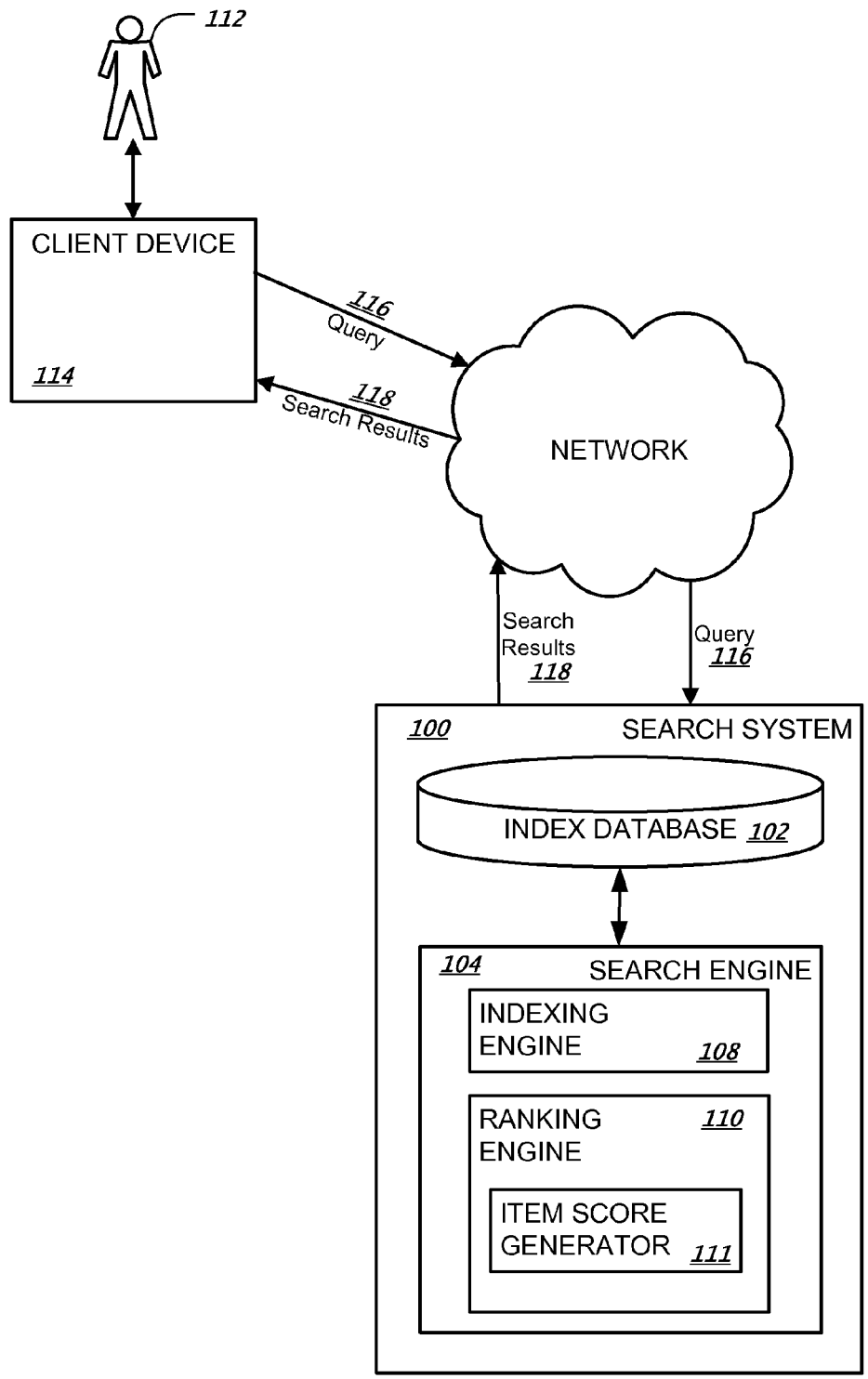
FIG. 1 illustrates an example search system.

FIG. 1 illustrates an example search system 100 for providing search results relevant to submitted queries as can be implemented in an internet, an intranet, or another client and server environment. The search system 100 can be implemented as, for example, computer programs running on one or more computers in one or more locations that are coupled to each other through a network.

The search system 100 includes an index database 102 and a search engine 104. The index database 102 stores index data for resources. Example resources include web pages, images, news articles, and social network posts.

The search engine 104 includes an indexing engine 108 and a ranking engine 110. The indexing engine 108 indexes resources and stores index information in the index database 102. The indexing engine can index resources using conventional techniques.

The ranking engine 110 ranks resources, for example, in response to user queries. The ranking engine 110 can rank the resources using conventional techniques. In some implementations, one input the ranking engine 110 uses to rank the resources is a respective item score associated with each resource. For example, the ranking engine 110 can rank a set of resources according to their respective item scores or according to a score for each resource that the ranking engine 100 derives from the item scores. An item can be, for example, a resource or an author identity of an author of a resource.

For illustrative purposes, the description below describes the case in which the item score is a query-independent quality score that represents an overall quality of the item. However, other item scores can also be generated and used. For example, the item score can be a query-dependent score that represents how well the item matches or satisfies a particular query.

The item scores are generated by an item score generator 111. The item score generator 111 generates the item score for an item from one or more values of indicators for the item. In general, an indicator is a characteristic or combination of characteristics of an item, and an indicator value is a value that represents a measurement or an estimate of the characteristic or combination of characteristics. Unlike systems that generate scores for items to be used in ranking by weighting each indicator value by a pre-determined fixed weight for the indicator, the item score generator weights one or more of the indicator values by a weight determined from an indicator-specific function of the indicator value.

In general, the value-specific weight for each indicator value reflects a confidence that the value accurately reflects the quality of the item. This is in contrast to systems that use fixed weights, where the weight reflects a confidence that the indicator itself, as opposed to the value, accurately reflects the quality of the item. This difference allows the item score generator 111 to place more importance on indicator values that more accurately represent the quality of the item, and to select different indicator values as more accurately representing different items. An example method for generating item scores is described in more detail below, with reference to FIG. 2.

In some implementations, the item score generator uses value-specific weights for all of the indicator values. In other implementations, the item score generator uses value-specific weights for the values of some, but not all, of the indicator values and uses fixed weights for the values of the other indicator values.

A user 112 generally interacts with the search system 100 through a user device 114. For example, the user device 114 can be a computer coupled to the search system 100 through a local area network (LAN) or wide area network (WAN), e.g., the Internet. In some implementations, the search system 100 and the user device 114 are implemented on one machine. For example, a user can install a search application on the user device 114.

The user 112 submits a query 116 to the search engine 104. When the user 112 submits a query 116, the query 116 is transmitted through a network, to the search system 100. The search engine 104 identifies and ranks resources that match the query 116. The search system then transmits search results 118 corresponding to the resources through the network to the user device 114 for presentation to the user 112, e.g., in a search results web page to be displayed by a web browser running on the user device 114.

Figure 2:
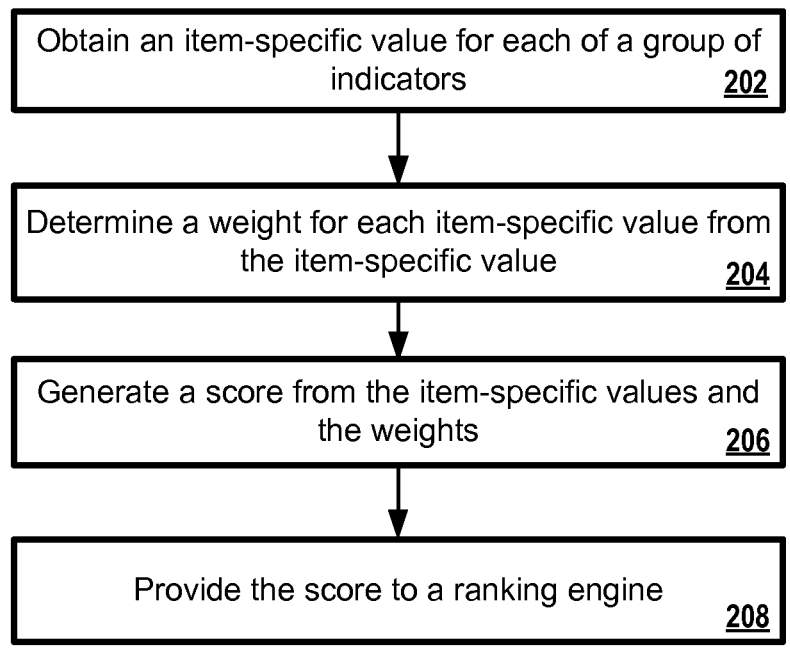
FIG. 2 is a flow diagram of an example method for generating an item score for an item and providing the item score to a search engine.

FIG. 2 is a flow diagram of an example method 200 for generating an item score for an item and providing the item score to a ranking engine. The item can be, for example, a resource or an author identity of an author of a resource. For convenience, the method 200 is described with reference to a system of one or more computers running one or more programs that perform the method. The system can be, for example, the item score generator 111 described above with reference to FIG. 1.

The system obtains an item-specific value for each indicator in a group of indicators (202). For example, if the item is a particular resource, an indicator for the particular resource can be the quality of the author of the resource and the indicator value can be a number that represents the quality of the author of the particular resource. As another example, if the item is an author identity of an author of a resource, an indicator for the author of the resource can be the number of positive reviews of resources authored by the author identity, and the value can be the actual number of positive reviews for the author identity. The system can obtain the item-specific value for each indicator in the group of indicators from one or more systems that analyze characteristics of the resource and generate item-specific values. These systems can generate the item-specific values using conventional techniques.

The system determines a weight for each item-specific value (204). The weight is used by the system to represent the relative importance of the indicator values when determining a score representing the quality of the particular item.

In general, the quality of different types of items is best represented by different indicators. For example, for a first type of item, indicators A, B, and C might best represent the quality of the item, while for a second type of item, indicators D, E, and F might best represent the quality of the item. The weight the system determines for each item-specific value represents a confidence that the value accurately represents the quality of the item. In the example given above, for example, the values for indicators A, B, and C for an item of the first type would have weights higher than usual, and the values for indicators D, E, and F for an item of the second type would have weights higher than usual.

In some implementations, the system determines the appropriate weight by applying a function that maps indicator values to weights. The function is indicator-specific. In other implementations, the system stores base weights for each indicator value. These base weights can be determined using conventional techniques, for example, using machine learning systems, human raters, hand tuning, or a combination of them. The system can then determine an appropriate weight adjustment to the base weight for each indicator value from the indicator value itself, for example, by applying an indicator-specific function that maps indicator values to weights or weight adjustments. The system can then adjust each base weight by the determined weight adjustment, and use the adjusted weight.

The weights can be learned using machine learning techniques. Regardless of whether the function the system uses specifies the full value of the weight or a weight adjustment, the coefficients of the function for an indicator can be determined from an analysis of training data that includes indicator values for multiple training items. The system doing the training can analyze this data and determine the appropriate coefficients for each indicator-specific function using conventional methods, for example, using machine learning techniques, human raters, and hand tuning of the coefficients. Each indicator-specific function can have a pre-determined form, for example, a polynomial function, a logarithmic function, an exponential function, a sine function, or a step function. Other forms can also be used.

For example, in some implementations, the system, or another system, receives data that includes indicator values for a number of items as well as a respective target score for each of the items. The target scores are obtained, for example, from human raters who rate the training items on a particular scale. The system then learns the coefficients for each indicator-specific function that best map the indicator values for each item to the target score.

In some implementations, the system learns the coefficients for all of the indicator-specific functions simultaneously. In other implementations, the system learns the coefficients for all of the indicator-specific functions individually, in sequence, and iterates over the functions until a convergence condition is satisfied. The convergence condition can be, for example, that a threshold number of iterations has been exceeded, or that less than a threshold change occurred in the coefficients of any function.

Figure 3:
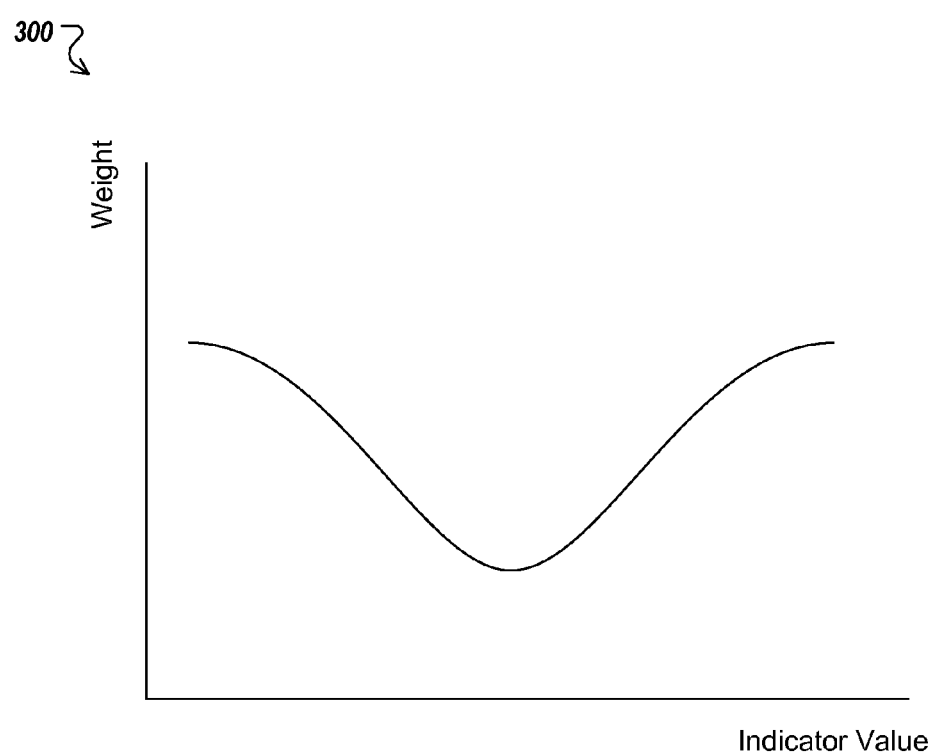
FIG. 3 is a graph of an example function that maps indicator values to weights.

FIG. 3 is an example graph 300 of an example relationship between indicator values for a particular indicator and weights for the indicator values. Indicator values on the high end or the low end have high weights, while indicator values in the middle have lower weights. FIG. 3 illustrates one example function, however other indicator-specific functions can also be used. For example, another example function could assign higher weights to indicator values in the middle than to indicator values on the low or high end. Another example function could assign higher weights to indicator values on one end, e.g., the high end or the low end, than to any other indicator values.

As shown in FIG. 2, the system generates a score from the item-specific values and the weights (206). In general, the score is a combination of the item-specific values, each weighted by its corresponding weight.

Various kinds of combinations can be used, depending on the relationships between the indicators. For example, if all of the indicators are good indicators, e.g., a higher value for each indicator indicates a higher quality of the item than a lower value does, or if all of the indicators are bad indicators, e.g., a higher value for each indicator indicates a lower quality of the item than a lower value does, the score can be a sum of the values, each weighted by its corresponding weight, i.e.:

$$\sum_{i \in I} (w_i(v_i) \times v_i)$$

where $v_i$ the value for indicator i, $w_i(v_i)$ is the weight for the indicator value $v_i$ for indicator i, and I is the set of indicators. Alternatively, the score can be a function of the sum.

As another example, if some of the indicators are good and some of the indicators are bad, the score can be a calculated from a sum of the values for the good indicators, each weighted by its corresponding weight, and a sum of the values for the bad indicators, each weighted by its corresponding weight.

For example, the score can be calculated by subtracting the sum of the values for the bad indicators from the sum of the values for the good indicators, i.e.:

$$\sum_{g \in G} (w_g(v_g) \times v_g) - \sum_{b \in B} (w_b(v_b) \times v_b)$$

where G is the set of indicators that have been classified as good, B is the set of indicators that have been classified as bad, $v_g$ is the value of indicator g, $v_b$ is the value of indicator b, $w_g(v_g)$ is the weight for the indicator value $v_g$ for indicator g, and $w_b(v_b)$ is the weight for the indicator value $v_b$ for indicator b. Alternatively the score can be a function of the difference.

Alternatively, the score can be calculated by dividing the sum of the values for the good indicators by the sum of the values of the bad indicators, i.e.:

$$\frac{\sum_{g \in G} w_g(v_g) \times v_g}{\sum_{b \in B} w_b(v_b) \times v_b}$$

where G is the set of indicators that have been classified as good, B is the set of indicators that have been classified as bad, $v_g$ is the value of indicator g, $v_b$ is the value of indicator b, $w_g(v_g)$ is the weight for the indicator value $v_g$ for indicator g, and $w_b(v_b)$ is the weight for the indicator value $v_b$ for indicator b. Alternatively, the score can be a function of the quotient.

Alternatively, bad indicators can be given negative weights and the score can be the sum, or a function of the sum.

The indicators used in the calculations described above can be, but do not have to be, independent of each other. In some implementations, the system combines multiple dependent indicator values, i.e. indicator values for indicators that are not independent but instead influence each other's values, into one combined indicator value that is used instead of the multiple dependent indicator values. Alternatively, if the dependent indicator values are not combined, the system can learn appropriate weights to account for the dependencies between indicator values, for example, using conventional machine learning techniques.

The system provides the score to a ranking engine (208), for example, the ranking engine 108 described above with reference to FIG. 1. The ranking engine ranks resources based, at least in part, on the item scores, for example, as described above with reference to FIG. 1.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
   generating a score for each of a plurality of items, the generating comprising, for each item:
   obtaining a respective item-specific value of each of a plurality of indicators;

determining a respective weight for the value of each of the plurality of indicators, wherein the respective weight for one or more of the plurality of indicators is derived from the value of the indicator; and generating the score for the item from the item-specific values, wherein generating the score comprises combining the item-specific values and weighting each item specific value by the respective weight for the value; and providing the score for each item to a ranking engine implemented on one or more computers, wherein the ranking engine ranks resources based, at least in part, on the scores for the items.

2. The system of claim 1, wherein each item-specific value of an indicator is derived from one or more characteristics of the item.

3. The system of claim 1, wherein determining the respective weight for a value of an indicator comprises determining the respective weight from an indicator-specific function that takes the value of the indicator as input.

4. The system of claim 3, wherein the indicator specific function takes the value of the indicator as input and outputs the respective weight for the value of the indicator.

5. The system of claim 3, wherein:
the function takes a value of an indicator as input and outputs a respective weight adjustment for the value of the indicator, and
determining the respective weight for the value of the indicator further comprises adjusting a base weight for the indicator by the respective weight adjustment.

6. The system of claim 1, wherein each item is a resource.

7. The system of claim 1, wherein each item is an author identity.

8. A computer-implemented method, comprising:
generating a score for each of a plurality of items, the generating comprising, for each item:
obtaining a respective item-specific value of each of a plurality of indicators;
determining a respective weight for the value of each of the plurality of indicators, wherein the respective weight for one or more of the plurality of indicators is derived from the value of the indicator; and
generating the score for the item from the item-specific values, wherein generating the score comprises combining the item-specific values and weighting each item specific value by the respective weight for the value; and
providing the score for each item to a ranking engine implemented on one or more computers, wherein the ranking engine ranks resources based, at least in part, on the scores for the items.

9. The method of claim 8, wherein each item-specific value of an indicator is derived from one or more characteristics of the item.

10. The method of claim 8, wherein determining the respective weight for a value of an indicator comprises determining the respective weight from an indicator-specific function that takes the value of the indicator as input.

11. The method of claim 10, wherein the indicator specific function takes the value of the indicator as input and outputs the respective weight for the value of the indicator.

12. The method of claim 10, wherein:
the function takes a value of an indicator as input and outputs a respective weight adjustment for the value of the indicator, and
determining the respective weight for the value of the indicator further comprises adjusting a base weight for the indicator by the respective weight adjustment.

13. The method of claim 8, wherein each item is a resource.

14. The method of claim 8, wherein each item is an author identity.

15. A non-transitory computer storage medium encoded with a computer program, the program comprising instructions that when executed by data processing apparatus cause the data processing apparatus to perform operations comprising:
generating a score for each of a plurality of items, the generating comprising, for each item:
obtaining a respective item-specific value of each of a plurality of indicators;
determining a respective weight for the value of each of the plurality of indicators, wherein the respective weight for one or more of the plurality of indicators is derived from the value of the indicator; and
generating the score for the item from the item-specific values, wherein generating the score comprises combining the item-specific values and weighting each item specific value by the respective weight for the value; and
providing the score for each item to a ranking engine implemented on one or more computers, wherein the ranking engine ranks resources based, at least in part, on the scores for the items.

16. The computer storage medium of claim 15, wherein each item-specific value of an indicator is derived from one or more characteristics of the item.

17. The computer storage medium of claim 15, wherein determining the respective weight for a value of an indicator comprises determining the respective weight from an indicator-specific function that takes the value of the indicator as input.

18. The computer storage medium of claim 17, wherein the indicator specific function takes the value of the indicator as input and outputs the respective weight for the value of the indicator.

19. The computer storage medium of claim 17, wherein:
the function takes a value of an indicator as input and outputs a respective weight adjustment for the value of the indicator, and
determining the respective weight for the value of the indicator further comprises adjusting a base weight for the indicator by the respective weight adjustment.

20. The computer storage medium of claim 15, wherein each item is a resource.

21. The computer storage medium of claim 15, wherein each item is an author identity.

* * * * *

UNITED STATES PATENT AND TRADEMARK OFFICE
CERTIFICATE OF CORRECTION

| | | |
|---|---|---|
| PATENT NO. | : 8,676,812 B1 | Page 1 of 1 |
| APPLICATION NO. | : 13/016902 | |
| DATED | : March 18, 2014 | |
| INVENTOR(S) | : Yihua Wu and Kumar Mayur Thakur | |

It is certified that error appears in the above-identified patent and that said Letters Patent is hereby corrected as shown below:

In the Claims:

Column 9, line 22, in Claim 4: delete "indicator specific" and insert -- indicator-specific --, therefor.

Column 9, line 28, in Claim 5: delete "indicator," and insert -- indicator; --, therefor.

Column 10, line 1, in Claim 11: delete "indicator specific" and insert -- indicator-specific --, therefor.

Column 10, line 7, in Claim 12: delete "indicator," and insert -- indicator; --, therefor.

Column 10, line 44, in Claim 18: delete "indicator specific" and insert -- indicator-specific --, therefor.

Column 10, line 50, in Claim 19: delete "indicator," and insert -- indicator; --, therefor.

Signed and Sealed this
Seventeenth Day of June, 2014

Michelle K. Lee
*Deputy Director of the United States Patent and Trademark Office*